United States Patent
Dürr et al.

(10) Patent No.: US 11,478,855 B2
(45) Date of Patent: Oct. 25, 2022

(54) POWDER BED MACHINE AND METHOD FOR ACQUIRING THE PROCESS DATA OF A MANUFACTURING PROCESS IN A POWDER BED MACHINE

(71) Applicants: Matthias Dürr, Nuremberg (DE); Bernhard Schenk, Feucht (DE)

(72) Inventors: Matthias Dürr, Nuremberg (DE); Bernhard Schenk, Feucht (DE)

(73) Assignee: Siemens Aktiengesellschaft, Munich (DE)

( * ) Notice: Subject to any disclaimer, the term of this patent is extended or adjusted under 35 U.S.C. 154(b) by 573 days.

(21) Appl. No.: 16/334,433

(22) PCT Filed: Sep. 20, 2016

(86) PCT No.: PCT/EP2016/072315
§ 371 (c)(1),
(2) Date: Mar. 19, 2019

(87) PCT Pub. No.: WO2018/054454
PCT Pub. Date: Mar. 29, 2018

(65) Prior Publication Data
US 2021/0283691 A1   Sep. 16, 2021

(51) Int. Cl.
*B22F 12/52*  (2021.01)
*B22F 12/90*  (2021.01)
(Continued)

(52) U.S. Cl.
CPC .............. *B22F 10/80* (2021.01); *B22F 10/28* (2021.01); *B22F 12/52* (2021.01); *B22F 12/90* (2021.01); *B33Y 30/00* (2014.12); *B33Y 50/02* (2014.12)

(58) Field of Classification Search
CPC .......... B22F 10/28; B22F 12/52; B22F 12/53; B22F 12/55; B22F 10/80; B22F 12/90; B33Y 30/00; B29C 64/20
See application file for complete search history.

(56) References Cited

U.S. PATENT DOCUMENTS 9,827,718 B2   11/2017   Sun
2004/0003741 A1   1/2004   Iskra
(Continued)

FOREIGN PATENT DOCUMENTS

CN   1955706 A   5/2007
CN   101464182 A   6/2009
(Continued)

OTHER PUBLICATIONS

I. Gibson, D.W. Rosen, and B. Stucker, Additive Manufacturing Technologies, DOI 10.1007/978-1-4419-1120-9_5, # Springer Science+Business Media, LLC 2010, chapter 5 (Year: 2010).*
(Continued)

*Primary Examiner* — Joseph S Del Sole
*Assistant Examiner* — Baileigh Kate Darnell
(74) *Attorney, Agent, or Firm* — Lempia Summerfield Katz LLC

(57) ABSTRACT

A powder bed machine including a distribution device, which is configured to be charged with process material. The powder bed machine has a residual powder tank within the manufacturing process, wherein the residual powder tank holds a surplus of the process material. The powder bed machine is positioned on feet and weighing cells are located in the feet.

5 Claims, 1 Drawing Sheet

(51) Int. Cl.
   *B33Y 30/00* (2015.01)
   *B22F 10/80* (2021.01)
   *B33Y 50/02* (2015.01)
   *B22F 10/28* (2021.01)

(56) References Cited

U.S. PATENT DOCUMENTS

| | | |
|---|---|---|
| 2007/0289783 A1 | 12/2007 | Tump |
| 2009/0151474 A1 | 6/2009 | Mehus |
| 2009/0159153 A1 | 6/2009 | Luechinger |
| 2011/0256252 A1 | 10/2011 | Amaya |
| 2013/0053995 A1 | 2/2013 | Hashimoto |
| 2015/0202687 A1 | 7/2015 | Pialot |
| 2016/0236419 A1 | 8/2016 | Griffin |
| 2017/0259337 A1* | 9/2017 | Furukawa ............... B33Y 50/02 |

FOREIGN PATENT DOCUMENTS

| | | |
|---|---|---|
| CN | 101896799 A | 11/2010 |
| CN | 201618041 U | 11/2010 |
| CN | 102950770 A | 3/2013 |
| CN | 104640652 A | 5/2015 |
| CN | 105328913 A | 2/2016 |
| DE | 102012014839 A1 | 1/2014 |
| EP | 1700686 A2 | 9/2006 |
| JP | H06297586 A | 10/1994 |

OTHER PUBLICATIONS

Chinese Office Action for Chinese Application No. 201680089418.1 dated Sep. 25, 2020, with English translation.
PCT International Search Report and Written Opinion of International Searching Authority dated May 19, 2017 corresponding to PCT international Application No. PCT/EP2016/072315 filed Sep. 20, 2016.

* cited by examiner

POWDER BED MACHINE AND METHOD FOR ACQUIRING THE PROCESS DATA OF A MANUFACTURING PROCESS IN A POWDER BED MACHINE

The present patent document is a § 371 nationalization of PCT Application Serial No. PCT/EP2016/072315, filed Sep. 20, 2016, designating the United States, which is hereby incorporated by reference.

TECHNICAL FIELD

The disclosure relates to a powder bed machine having a distribution device configured to be charged with process material and which has a residual powder tank within the manufacturing process, which residual powder tank holds surplus process material, and to a method for acquiring the process data of a manufacturing process in a powder bed machine.

BACKGROUND

The continuous monitoring of powder bed processes, (e.g., selective laser melting), is currently automated only to a small degree. There are numerous potential errors which it has hitherto not been possible to identify and rule out. The numerous potential errors include, in particular, that the powder store is exhausted during the building order. This may under some circumstances lead to an unidentified process termination. Furthermore, the use of an incorrect powder for the intended building order cannot be ruled out. This also applies to the use of incorrect building plates. Furthermore, faults in the coating may arise, which are identified by non-automated monitoring and at too late a point in time.

These potential errors have hitherto been minimized by virtue of the building preparation and monitoring being performed by qualified personnel. This measure is supplemented by checklists and process descriptions.

SUMMARY AND DESCRIPTION

The scope of the present disclosure is defined solely by the appended claims and is not affected to any degree by the statements within this summary. The present embodiments may obviate one or more of the drawbacks or limitations in the related art.

It is the object of the present disclosure to create a powder bed machine, the manufacturing processes of which may be monitored in an automated process, and to specify a method for acquiring the process data of a manufacturing process in a powder bed machine of the type.

The object is achieved by a powder bed machine having a distribution device configured to be charged with process material and which has a residual powder tank within the manufacturing process, which residual powder tank holds surplus process material. The powder bed machine is positioned on feet, wherein weighing cells are arranged in the feet.

The use of weighing cells in the feet of the machine makes it possible to acquire the absolute filling of the storage container and the displacement of the center of gravity during the printing process. In particular, in the case of metal powders, the ratio of material weight to machine weight permits the possibility of good acquisition using conventional sensors. Furthermore, the acquisition of the change in weight resulting from the installation of a building plate or of attachment parts is possible. Through the use of the weight values and the corresponding engineering data (e.g., building parameters, order data, etc.), it is possible to obtain various items of information relating to the manufacturing process.

It is now possible to determine whether the filled powder quantity is sufficient for the planned building order or whether the filled material corresponds to the materials specified for the component. This would be possible for example by a plausibility check.

It is furthermore possible to determine whether the ratio of refilled material and existing material, which may be determined based on the residual quantity in the storage container, is admissible, or whether further process acts are required. It is furthermore possible to determine whether the weight of the building plate corresponds to the material specified for the building order, or whether intended attachment parts are installed.

From the dynamic profile during the building process, it is possible for further conclusions to be drawn from the shift of the center of gravity. It is firstly possible to determine whether the shift of the center of gravity correlates with the planned layer thickness, or whether the layer thickness drifts over the course of the building process. It is secondly possible to determine whether an undesirably high fraction of the powder used reaches the residual powder container rather than the building cylinder.

The disclosure advantageously includes monitoring the manufacturing processes in a powder bed machine in a user-friendly manner without the need to make significant modifications to the machine. The powder bed machine outputs process data which are made available in an automated process and which thus contribute significantly to quality assurance in the operation of the machine.

With this approach, even retroactive automation of the process sequence in SLM/EBM machines is possible with relatively little effort.

One development of the concept provides for a powder tank to be arranged above the distribution device.

An alternative embodiment of the concept may include a storage cylinder being arranged below the distribution device.

One advantageous embodiment of the concept may include the powder bed machine having at least two feet with in each case one weighing cell.

One advantageous embodiment may provide for a foot with weighing cell to be arranged below the powder tank or the storage cylinder.

A further advantageous embodiment may provide for a further foot with weighing cell to be arranged below the residual powder tank.

A yet further advantageous embodiment may provide that at least one further foot with weighing cell is arranged under the powder bed machine such that the foot with weighing cell is, in relation to the other feet with weighing cell, positioned outside the process direction.

One specific embodiment may include that, before the residual powder tank in the process direction, there is arranged a building cylinder for receiving the produced product during the manufacturing process.

One advantageous embodiment of the concept may include that the weighing cells are retrofittable.

The object according to the disclosure is furthermore achieved by a method for acquiring the process data of a manufacturing process in a powder bed machine. The method includes the following acts: determining the filling level of process material in the storage container at the start of the manufacturing process; determining the filling level of process material in the residual powder tank at the end of the manufacturing process; and comparing the determined measured values with existing measured values for the specific manufacturing process.

A further advantageous embodiment of the method may provide that, for the preparation of the manufacturing process in the powder bed machine, the center of gravity is determined prior to the commencement of the setup of the powder bed machine.

One specific embodiment of the method may include that, after the end of the setup of the powder bed machine, the center of gravity is determined.

One advantageous embodiment of the method may include that the determined measured values are compared with the shift of the center of gravity that is to be expected in the case of correct installation of the attachment parts necessary for the manufacturing process.

A further advantageous embodiment of the method may provide that, from the dynamic profile during the building process relating to the shift of the center of gravity, it is determined whether this correlates with the planned layer thickness of the product.

One specific embodiment of the method may include that, from the dynamic profile during the building process relating to that fraction of the powder used which is collected in the residual powder tank, it is determined whether the process flow is correct.

The powder bed machine has a distribution device which makes it possible for a manufacturing process to be carried out. The distribution device is charged with process material from a storage container. The storage container may, in a first variant, be in the form of a powder tank which is positioned above the distribution device in the powder bed machine. In a second variant, the storage container may be in the form of a storage cylinder, which is arranged below the distribution device.

The powder bed machine furthermore has a residual powder tank which receives surplus process material and which is arranged, in a process direction, after a building cylinder in which the product is produced. The building cylinder is positioned, in the process direction, after the storage container and before the residual powder tank. The powder bed machine stands on at least two feet, which are each formed with a weighing cell. One foot with weighing cell may be positioned at the start of the process, (e.g., below the storage container). The storage container may be of asymmetrical form, (e.g., situated substantially above the first foot). The one further foot with weighing cell is positioned at the end of the process, (e.g., arranged below the residual powder tank). By the stated enhancements, it is additionally also possible, in part, to acquire and monitor the setup of the powder bed machine with, for example, attachment parts.

BRIEF DESCRIPTION OF THE DRAWINGS

Further embodiments and advantages of the disclosure will be discussed below on the basis of an exemplary embodiment and on the basis of the drawings.

DETAILED DESCRIPTION

Figure 1:
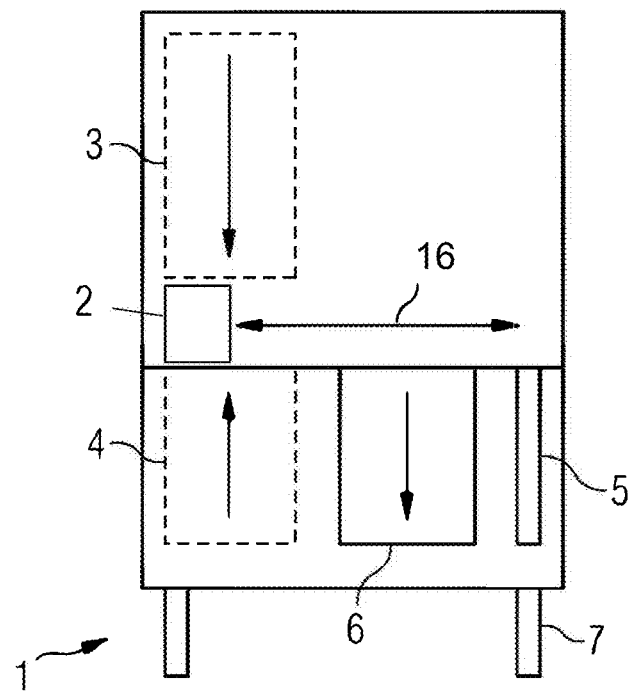
FIG. 1 diagrammatically depicts, in a schematic illustration, the construction of a powder bed machine from the prior art.

FIG. 1 diagrammatically depicts the construction of a powder bed machine 1 having a distribution device 2 which makes it possible for a manufacturing process to be carried out. The distribution device 2 is charged with process material from a storage container and configured to distribute the process material along a process direction 16. The storage container may, in a first variant, be in the form of a powder tank 3, which is positioned above the distribution device 2 in the powder bed machine 1. In a second variant, the storage container may be in the form of a storage cylinder 4, which is arranged below the distribution device 2. The powder bed machine 1 furthermore has a residual powder tank 5, which receives surplus process material and which is arranged, in a process direction 16, after a building cylinder 6 in which the product is produced. The building cylinder 6 is positioned, in the process direction 16, after the storage containers and before the residual powder tank 5. The powder bed machine 1 may be arranged on feet 7.

Figure 2:
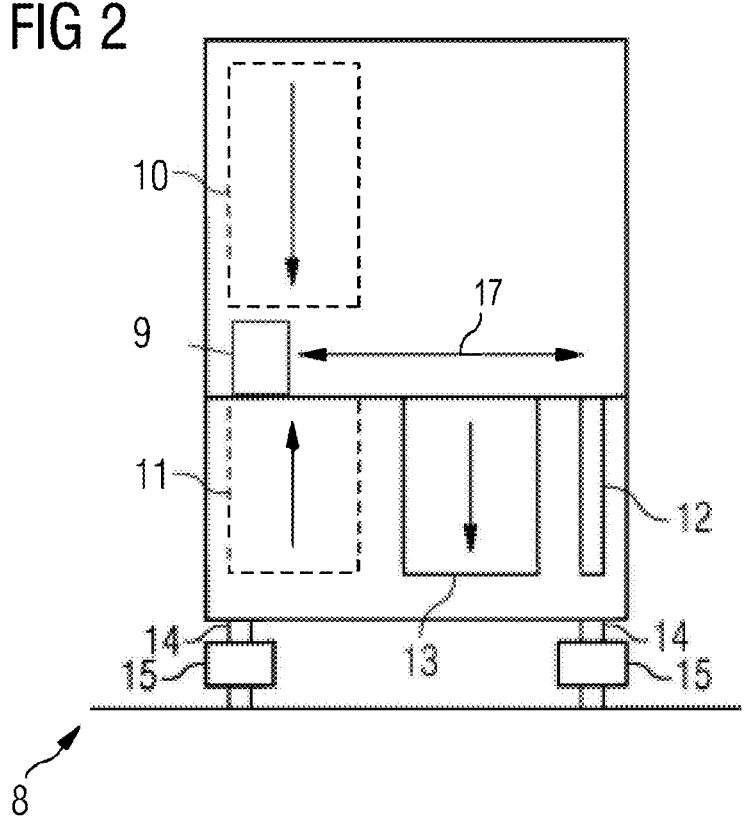
FIG. 2 diagrammatically depicts the construction of a powder bed machine according to an embodiment.

FIG. 2 diagrammatically illustrates the construction of a powder bed machine 8. The powder bed machine 8 has a distribution device 9 which makes it possible for a manufacturing process to be carried out. The distribution device 9 is charged with process material from a storage container and configured to distribute the process material along a process direction 16. The storage container may, in a first variant, be in the form of a powder tank 10, which is positioned above the distribution device 9 in the powder bed machine 8. In a second variant, the storage container may be in the form of a storage cylinder 11, which is arranged below the distribution device 9. The powder bed machine 8 furthermore has a residual powder tank 12, which receives surplus process material and which is arranged, in a process direction 17, after a building cylinder 13 in which the product is produced. The building cylinder 13 is positioned, in the process direction 17, after the storage container and before the residual powder tank 12. The powder bed machine 8 stands on at least two feet 14, which are each formed with a weighing cell 15. The first foot 14 with weighing cell 15 may be positioned at the start of the process, (e.g., below the storage container). The storage container may be of asymmetrical form, (e.g., situated substantially above the first foot 14). The one further foot 14 with weighing cell 15 is positioned at the end of the process, that is to say below the residual powder tank 12.

The powder bed machine is characterized in that, by a simple and automated determination of the filling level of the storage container, process data for the respective manufacturing process are determined which provide the quality assurance of the produced product. With this approach, even retroactive automation of the process monitoring in SLM/EBM machines is possible with relatively little effort. By the stated enhancements, it is additionally also possible, in part, to acquire and monitor the setup of the powder bed machine with, for example, attachment parts.

Although the disclosure has been illustrated and described in detail by the exemplary embodiments, the disclosure is not restricted by the disclosed examples and the person skilled in the art may derive other variations from this without departing from the scope of protection of the disclosure. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A powder bed machine comprising:
   a storage container;
   a distribution device configured to be charged with process material from the storage container;
   a residual powder tank; and
   a building cylinder configured to receive a produced product from a printing process carried out via the distribution device, wherein the building cylinder is positioned after the storage container and before the residual powder tank in a process direction of the printing process,
   wherein the residual powder tank is configured to hold a portion of the process material distributed via the distribution device,
   wherein the powder bed machine is positioned on a plurality of feet,
   wherein a first foot of the plurality of feet has a first weighing cell, and is positioned below the storage container,
   wherein a second foot of the plurality of feet has a second weighing cell, and is positioned below the residual powder tank,
   wherein the first and second weighing cells are configured to detect an absolute filling of the storage container, and
   wherein the first and second weighing cells are configured to detect a displacement of a center of gravity of the powder bed machine during the printing process.

2. The powder bed machine of claim 1, wherein the storage container is a powder tank arranged above the distribution device.

3. The powder bed machine of claim 1, wherein the storage container is a storage cylinder arranged below the distribution device.

4. The powder bed machine of claim 1, wherein a third foot of the plurality of feet has a third weighing cell, and is arranged under the powder bed machine such that the third foot with the third weighing cell is, in relation to the first and second feet with the first and second weighting cells, respectively, positioned outside the process direction.

5. The powder bed machine of claim 1, wherein the first and second weighing cells are replaceable.

* * * * *